(12) United States Patent
Husain et al.

(10) Patent No.: US 6,485,645 B1
(45) Date of Patent: Nov. 26, 2002

(54) BIOLOGICAL PROCESS FOR REMOVING PHOSPHORUS INVOLVING A MEMBRANE FILTER

(75) Inventors: Hidayat Husain, Brampton; Frederic Koch, Vancouver; Deonarine Phagoo, Toronto, all of (CA)

(73) Assignee: Zenon Environmental Inc, Oakville (CA)

( * ) Notice: Subject to any disclaimer, the term of this patent is extended or adjusted under 35 U.S.C. 154(b) by 0 days.

(21) Appl. No.: 10/134,449

(22) Filed: Apr. 30, 2002

Related U.S. Application Data

(62) Division of application No. 09/646,115, filed as application No. PCT/CA00/00854 on Jul. 19, 2000, now Pat. No. 6,406,629.

(30) Foreign Application Priority Data

Jul. 20, 1999 (CA) ............................................. 2278265

(51) Int. Cl.[7] .................................................. C02F 3/00
(52) U.S. Cl. .................... 210/605; 210/620; 210/195.3; 210/196; 210/723
(58) Field of Search ................................ 210/605, 620, 210/195.3, 196, 723

(56) References Cited

U.S. PATENT DOCUMENTS 3,654,147 A    4/1972    Levin et al.

(List continued on next page.)

FOREIGN PATENT DOCUMENTS

| JP | 61090795 | 5/1986 |
| JP | 61242698 | 10/1986 |
| JP | 63091196 | 4/1988 |
| JP | 63097289 | 4/1988 |

(List continued on next page.)

OTHER PUBLICATIONS

English language abstract of JP 61090795.

(List continued on next page.)

*Primary Examiner*—Chester T. Barry
(74) *Attorney, Agent, or Firm*—Bereskin & Parr

(57) ABSTRACT

A waste water treatment process for biologically removing phosphates incorporates a membrane filter. The process includes three zones, an anaerobic zone, an anoxic zone and an aerobic zone containing an anaerobic, anoxic and aerobic mixed liquor. Water to be treated flows first into the anaerobic zone. Anaerobic mixed liquor flows to the anoxic zone. Anoxic mixed liquor flows both back to the anaerobic zone and to the aerobic zone. The aerobic mixed liquor flows to the anoxic zone and also contacts the feed side of a membrane filter. The membrane filter treats the aerobic mixed liquor to produce a treated effluent lean in phosphorous, nitrogen, BOD OR COD, suspended solids and organisms at a permeate side of the membrane filter and a liquid rich in rejected solids and organisms. Some or all of the material rejected by the membrane filter is removed from the process either directly or by returning the material rejected by the membrane filter to the anoxic or aerobic zones and wasting aerobic sludge. In a first optional side stream process, phosphorous is precipitated from a liquid lean in solids extracted from the anaerobic mixed liquor. In a second optional side stream process, anaerobic mixed liquor is treated to form insoluble phosphates which are removed in a hydrocyclone.

17 Claims, 5 Drawing Sheets

U.S. PATENT DOCUMENTS

| | | | |
|---|---|---|---|
| 3,764,523 | A | 10/1973 | Stankewich |
| 3,926,794 | A | 12/1975 | Vahldieck |
| 4,056,465 | A | 11/1977 | Spector |
| 4,389,317 | A | 6/1983 | Trentalman et al. |
| 4,500,427 | A | 2/1985 | Susuki |
| 4,721,570 | A | 1/1988 | Ankaitis |
| 4,867,883 | A | 9/1989 | Daigger et al. |
| 5,480,548 | A | 1/1996 | Daigger |
| 5,554,289 | A | 9/1996 | Grounds |
| 5,624,562 | A | 4/1997 | Scroggins |
| 5,658,458 | A | 8/1997 | Keyser et al. |
| 6,113,789 | A | 9/2000 | Burke |
| 6,228,264 | B1 | 5/2001 | Yamasaki et al. |

FOREIGN PATENT DOCUMENTS

| | | |
|---|---|---|
| JP | 63175687 | 7/1988 |
| JP | 63221893 | 9/1988 |
| JP | 63236588 | 10/1988 |
| JP | 63264191 | 11/1988 |
| JP | 63302996 | 12/1988 |
| JP | 64090098 | 4/1989 |
| JP | 01215400 | 8/1989 |
| JP | 2139099 | 5/1990 |
| JP | 4215892 | 8/1992 |
| JP | 5104090 | 4/1993 |
| JP | 7222994 | 8/1995 |
| JP | 7232192 | 9/1995 |
| JP | 9225492 | 9/1997 |
| WO | WO 02/10077 A1 | 2/2002 |

OTHER PUBLICATIONS

English language abstract of JP 61242698.
English language abstract of JP 63091196.
English language abstract of JP 63097289.
English language abstract of JP 63175687.
English language abstract of JP 63221893.
English language abstract of JP 63236588.
English language abstract of JP 63264191.
English language abstract of JP 63302996.
English language abstract of JP 64090098.
English language abstract of JP 01215400.
English language abstract of JP 2139099.
English language abstract of JP 4215892.
English language abstract of JP 7222994.
English language abstract of JP 7232192.
"Role of Biological processes in Phosphate Recovery", Mark Van Loosdrecht, www.nhm.ac.uk/mineralology/phos/Loosdr.htm pp. 1–2, May 20, 1999.
"Biological Phosphorus Removal", pp. 15–29.
"Physico–chemical Phosphorus Removal" pp. 5–14.

BIOLOGICAL PROCESS FOR REMOVING PHOSPHORUS INVOLVING A MEMBRANE FILTER

This is a division of U.S. patent application Ser. No. 09/646,115 filed Sep. 27, 2000 which is a National Stage of PCT application Ser. No. PCT/CA00/00854 filed on Jul. 19, 2000 now U.S. Pat. No. 6,406,629. The entire disclosure both of these of applications is incorporated herein by this reference.

FIELD OF THE INVENTION

The present invention relates to waste water treatment, and more particularly to a process for removing phosphorous from waste water involving biological processes and a membrane filter.

BACKGROUND OF THE INVENTION

BOD, nitrates and phosphates released into the environment cause eutrophication and algae blooming resulting in serious pollution and health problems. Waste water treatment processes attempt to remove BOD, nitrates and phosphates to produce an acceptable effluent.

Conventional processes for removing phosphates from waste water include chemical precipitation and biological methods. In chemical precipitation methods, soluble salts, such as ferrous/ferric chloride or aluminum sulphate, are added to the waste water to form insoluble phosphate metal salts. The waste water, however, contains many different ions which create undesirable side reactions with the precipitants. As a result, and particularly where very low effluent total phosphorus levels are required, these processes may require the addition of 5–6 times the stoichiometric amount of chemicals required to remove the phosphates. Accordingly, these processes result in high chemical costs, high sludge production, and a high level of metallic impurities in the sludge.

In contrast, biological methods use microorganisms to digest the phosphates. For example, U.S. Pat. No. 4,867,883 discusses a process which attempts to create conditions which encourage the selection and growth of Bio-P organisms, a strain of bacteria which have the ability-to uptake phosphorus in excess of the amount normally needed for cell growth. The amount of phosphorus removal that can be achieved is directly proportional to the amount of Bio-P organisms in the system. Generally, the process consists of an anaerobic zone, an anoxic zone, an aerobic zone, a clarifier, and a variety of recycles to interconnect the various zones. In a preferred embodiment of the process, there is a denitrified recycle from the anoxic zone to the anaerobic zone, a nitrified recycle from the aerobic zone to the anoxic zone, and an activated sludge recycle from the clarifier to the anoxic zone. In the anaerobic zone, there is BOD assimilation and phosphorus release. Subsequently, in the anoxic and aerobic zones, there is phosphorus uptake. In the clarifier, sludge containing phosphates settles out of the effluent. In some cases, sand filters are employed to try to further reduce the amount of phosphates in the effluent.

One problem with the US '883 process is that there can be a build up of phosphates in the system. At the end of the process, a portion of the recycled activated sludge is wasted and is subsequently treated, typically by aerobic or anaerobic digestion processes. This results in a release of phosphorus taken up in the process. This phosphorus is then returned back to the process in the form of digester supernatant. Consequently, this reduces the efficiency of phosphorus removal in the process and results in higher levels of phosphorus in the effluent. A partial solution to this problem is to employ a side stream process called 'Phos-Pho Strip' as described in U.S. Pat. No. 3,654,147. In this process, the activated sludge, which has a high concentration of phosphorus, passes from the clarifier to a phosphorus stripper. In the stripper, phosphorus is released into the filtrate stream by either: creating anaerobic conditions; adjusting the pH; or extended aeration. The resulting phosphate-rich filtrate stream passes to a chemical precipitator. The phosphate-free effluent stream is added to the main effluent stream, the waste stream from the precipitator containing the phosphates is discarded, and the phosphate-depleted activated sludge is returned to the main process.

Another disadvantage with the process in US '883 is that significant design limitations are imposed by the settling characteristics of the sludge in the clarifier. For example, the process cannot operate at very high process solids levels or high sludge retention times. As a result, the system is generally considered to be inefficient and there is a high generation rate of waste sludge.

A second type of biological treatment is referred to as a membrane bioreactor which can be combined with chemical precipitation techniques. In a simple example, precipitating chemicals are added to an aerobic tank containing or connected to a membrane filter. As above, however, dosages of precipitating chemicals substantially in excess of the stoichiometric amount of phosphates are required to achieve low levels of phosphates in the effluent. This results in excessive sludge generation and the presence of metallic precipitates which increase the rate of membrane fouling or force the operator to operate the system at an inefficient low sludge retention time.

Also relevant to the present invention is U.S. Pat. No. 5,658,458 which discloses a treatment for activated sludge involving the separation of trash and inerts. Generally, the process consists of a screen which removes relatively large pieces of 'trash' and a hydrocyclone which uses a centrifugal force to separate the organics from the inerts. The activated sludge is recycled back to the system and the trash and inerts are discarded.

SUMMARY OF THE INVENTION

It is an object of the present invention to remove phosphorous from waste water. In some aspects, the invention provides a process for treating water to remove phosphorous and nitrogen. The process includes three zones, an anaerobic zone, an anoxic zone and an aerobic zone. In the anaerobic zone, an anaerobic mixed liquor has organisms which release phosphorous into the anaerobic mixed liquor and store volatile fatty acids from the anaerobic mixed liquor. In the anoxic zone, an anoxic mixed liquor has organisms which metabolize stored volatile fatty acids, uptake phosphorous and denitrify the anoxic mixed liquor. In the aerobic zone, an aerobic mixed liquor has organisms which metabolize stored volatile fatty acids, uptake phosphorous and nitrify the aerobic mixed liquor.

Water to be treated flows first into the anaerobic zone to join the anaerobic mixed liquor. Anaerobic mixed liquor flows to the anoxic zone to join the anoxic mixed liquor. Anoxic mixed liquor flows both back to the anaerobic zone to join the anaerobic mixed liquor and to the aerobic zone to join the aerobic mixed liquor. The aerobic mixed liquor flows to the anoxic zone to join the anoxic mixed liquor and also contacts the feed side of a membrane filter. The membrane filter treats the aerobic mixed liquor to produce a treated effluent lean in phosphorous, nitrogen, BOD, suspended solids and organisms at a permeate side of the membrane filter and a liquid rich in rejected solids and organisms.

Some or all of the material rejected by the membrane filter is removed from the process. This may be done by locating the membrane filter outside of the aerobic zone and directly removing the liquid rich in rejected solids and organisms from the retentate or feed side of the membrane filter. Alternatively, the membrane filter may be located in the aerobic zone so that the material rejected by the membrane filter mixes with the aerobic mixed liquor. The material rejected by the membrane filter is then removed by removing aerobic mixed liquor. Further alternatively, the liquid rich in material rejected by the membrane filter may be recycled to the anoxic or aerobic zones. The material rejected by the membrane filter is then removed by removing aerobic mixed liquor. Combinations of the first and third methods described above may also be used.

The steps described above are performed substantially continuously and substantially simultaneously. In the anaerobic zone, fermentive bacteria convert BOD into volatile fatty acids. Bio-P organisms use the volatile fatty acids as a carbon source. In doing so, they release phosphorus into the liquor, and store volatile fatty acids for later use. The stored carbon compounds may come from volatile fatty acids produced in the anaerobic zone or from materials produced external to the process or both. For example, upstream waste water fermentation can occur either in prefermentation units specifically designed for this purpose, or inadvertently in the sewage system. Subsequently, in the anoxic and aerobic zones, the Bio-P organisms metabolize the stored volatile fatty acids and uptake phosphates from the liquor. The recycle between the anoxic and anaerobic zones allows the process to operate substantially continuously.

The stream exiting the aerobic zone passes through the membrane filter. In the membrane filter, phosphorus-rich activated sludge, finely suspended colloidal phosphorus, bacteria, and other cellular debris are rejected by the membrane. A waste activated sludge containing material rejected by the membrane filter, optionally combined with aerobic mixed liquor, flows to a sludge management or processing system. A phosphorous lean effluent is produced at the permeate side of the membrane filter. The effluent is also reduced in nitrogen as a result of the anoxic and aerobic zones and the recycle between them.

The membrane filter removes colloidal phosphorus and bacteria which would normally pass through a clarifier. Although the absolute amount of colloidal solids is relatively small, the percentage of phosphorus in the colloids is surprisingly high and its removal results in unexpected low levels of phosphorus in the effluent. With membrane filters to remove biomass from the effluent stream, a fine biomass can be maintained in the anaerobic reactor. This may result in enhanced reaction rates and higher than anticipated release of phosphorus in the anaerobic reactor, with resulting higher uptake of phosphorus in the anoxic and aerobic zones. Further, since the process is not limited by the settling characteristics of the sludge, the process is able to operate at very high process solid levels, preferably with an MLSS between 3 and 30 mg/L and short net hydraulic retention times, preferably between 2 and 12 hours. The short HRT allows increased throughput of waste water for a given reactor size. In addition, since the design avoids chemical precipitation of phosphates upstream of the membrane filters, there is reduced membrane fouling which further enhances the performance of the process. Moreover, contaminants in the sludge resulting from precipitating chemicals are reduced permitting the system to operate at a high sludge age. At high sludge retention times, preferably between 10 and 30 days, an unexpected significant crystalline phosphorus accumulation occurs in the biomass, effectively removing phosphorus from the system. As well, there is lower net sludge generation.

The processes described above optionally includes one of two side stream processes. In a first side stream process, a liquid lean in solids but containing phosphorous is extracted from the anaerobic mixed liquor. Phosphorous is precipitated from that liquid to produce a phosphorous lean liquid which leaves the process as effluent or is returned to the anoxic or aerobic zones. In a second side stream process, anaerobic mixed liquor is removed to a reaction zone and treated to form a liquid rich in insoluble phosphates. The liquid rich in insoluble phosphates is treated in a hydrocyclone to separate out insoluble phosphates and create a liquid lean in insoluble phosphates. The liquid lean in insoluble phosphates is returned to the anoxic zone.

BRIEF DESCRIPTION OF THE DRAWINGS

Embodiments of the present invention will be described below with reference to the following figures.

DETAILED DESCRIPTION OF THE INVENTION

Figure 1:
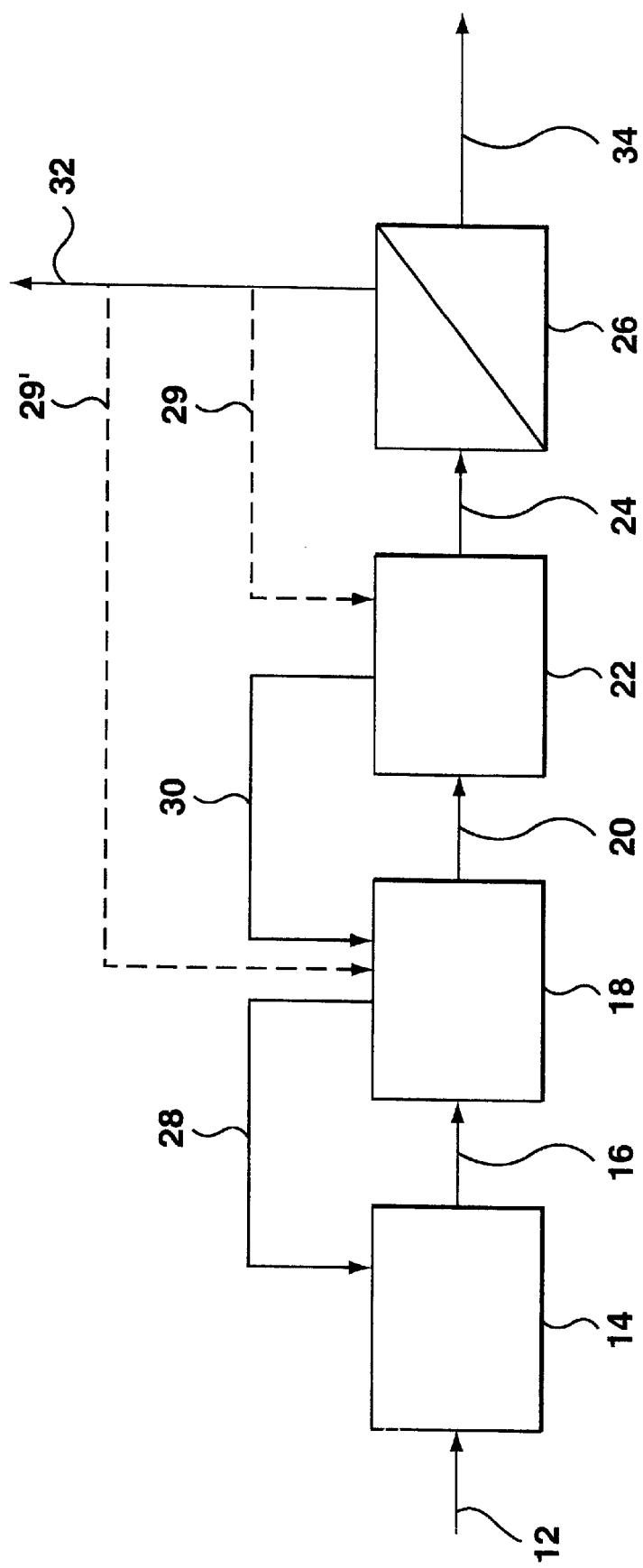
FIG. 1 is a schematic diagram illustrating a first process.

A first process is shown in FIG. 1. An influent 12, which contains BOD, ammonia and phosphates, enters an anaerobic zone 14 to mix with anaerobic mixed liquor contained there. An anaerobic exit stream 16 carries anaerobic mixed liquor from the anaerobic zone 14 to mix with anoxic mixed liquor contained in an anoxic zone 18. An anoxic exit stream 20 carries anoxic mixed liquor from the anoxic zone 18 to mix with aerobic mixed liquor contained in an aerobic zone 22. An aerobic exit stream 24 carries aerobic mixed liquor from the aerobic zone 22 to the retentate or feed side a membrane filter 26 located outside of the aerobic zone 22 and preferably having microfiltration or ultrafiltration membranes. A waste activated sludge stream 32, consisting of components or material rejected by the membrane filter 26, exits from the membrane filter 26. An effluent stream 34 exits from the permeate side of the membrane filter 26 and is substantially phosphate reduced. A denitrified liquor recycle 28 carries anoxic mixed liquor from the anoxic zone 18 to mix with the anaerobic mixed liquor in the anaerobic zone 14. As well, a nitrified liquor recycle 30 carries aerobic mixed liquor from the aerobic zone 22 to mix with the anoxic mixed liquor in the anoxic zone 18.

In the anaerobic zone 14, fermentive bacteria in the anaerobic mixed liquor convert BOD into volatile fatty acids. Under anaerobic conditions and in the absence of nitrates, Bio-P organisms grow which use volatile fatty acids as a carbon source. In doing so, they release phosphorus into the liquor, and store volatile fatty acids as a substrate for later use. Anoxic mixed liquor from the denitrified liquor recycle 28 decreases the concentration of nitrates in the anaerobic mixed liquor in the first anaerobic zone 14, should there be any, which enhances the selection and growth of Bio-P organisms.

In the anoxic zone 18, Bio-P organisms in the anoxic mixed liquor metabolize the stored volatile fatty acids, providing energy for growth, and uptake phosphates from the solution. Thus, the efficiency of phosphate uptake in the anoxic zone 18 is related to the uptake of volatile fatty acids in the anaerobic zone 14 particularly given the nitrified liquor recycle 30 from the first aerobic zone 22 to the anoxic zone 18. In the anoxic zone 18, denitrifying bacteria also convert nitrates to N2 gas.

In the aerobic zone 22, Bio-P organisms in the aerobic mixed liquor further metabolize the stored volatile fatty acids, providing more energy for growth, and further uptake of phosphates from the aerobic mixed liquor. In addition NH3 is converted to nitrates to be recycled to the anoxic zone 18.

Aerobic mixed liquor flows to the feed or retentate side of the membrane filter 26. The membrane filter 26 rejects phosphorus-rich activated sludge, finely suspended colloidal phosphorus, bacteria, inorganic particles such as grit, trash and other cellular debris. Liquid containing this rejected material forms a waste activated sludge stream 32 which may either be discarded or sent to a secondary sludge processing system, such as aerobic or anaerobic digestion. Alternatively, some of the liquid containing material rejected by the membranes can be recycled to the aerobic zone 22 through a retentate recycle stream 29 or to the anoxic zone 18 through a second retentate recycle stream 29'. When liquid containing material rejected by the membranes is recycled to the anoxic zone 18, its flow and concentration is included in any calculation of recycle from the aerobic zone 22 to the anoxic zone 18. In particular, where a second recycle stream 29' of high flux is used, it may not be necessary to provide either a retentate recycle stream 29 or a nitrified liquor recycle 30.

Figure 2:
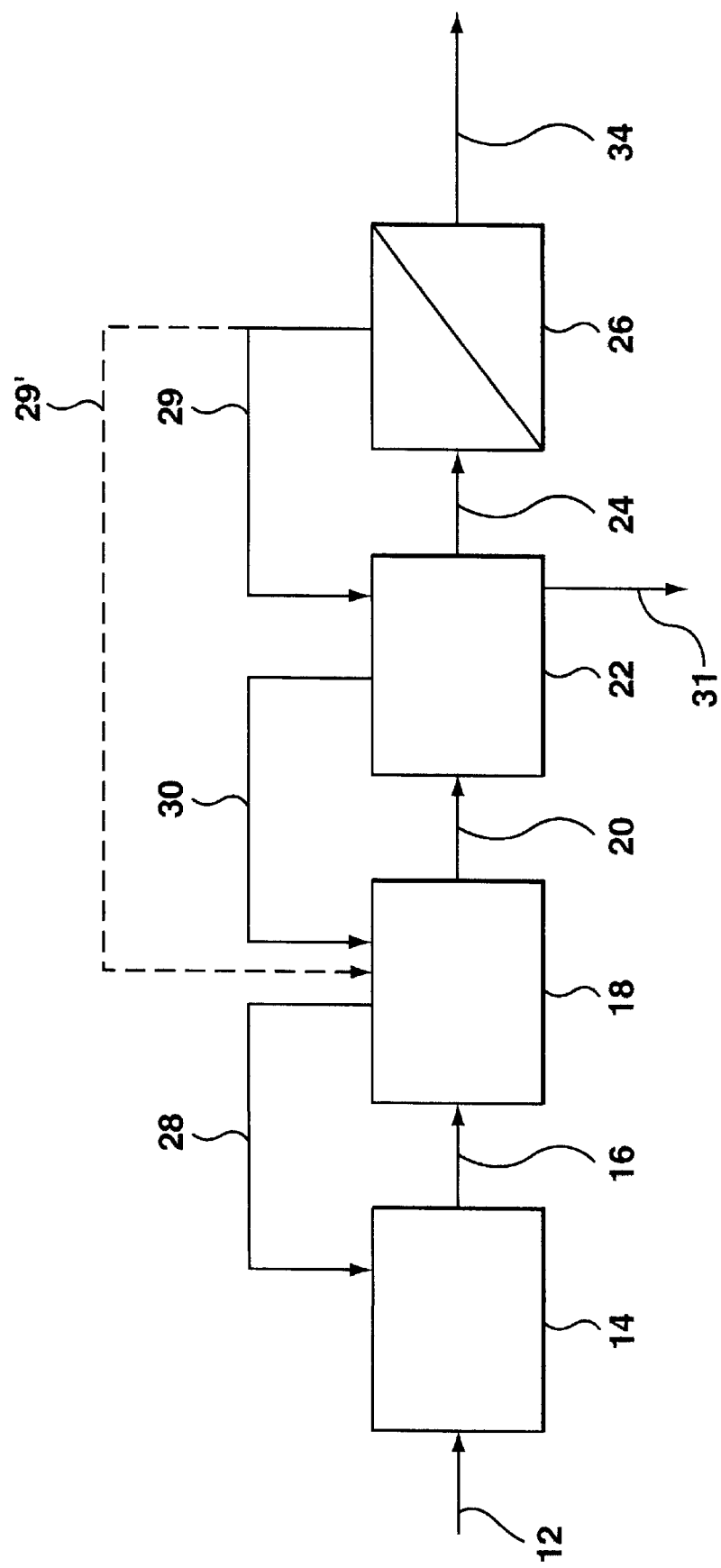
FIG. 2 is a schematic diagram illustrating a second process.

Referring now to FIG. 2, a second process is shown. The second process is similar to the first process but with modifications as described below. The retentate liquid containing material rejected by the membranes does not leave the process directly but are recycled back to process. This material leaves the process indirectly, combined with sludge from the process in general, as waste sludge taken from the aerobic zone 22. This waste sludge flows out of the process in a second waste activated sludge stream 31 from the aerobic zone 22 and may be periodically discarded or sent to a secondary sludge management or processing system, such as aerobic or anaerobic digestion. The liquid containing material rejected by the membranes can be recycled to the aerobic zone 22 through a retentate recycle stream 29 or to the anoxic zone 18 through a second retentate recycle stream 29'. When liquid containing material rejected by the membranes is recycled to the anoxic zone 18, its flow and concentration is included in any calculation of recycle from the aerobic zone 22 to the anoxic zone 18.

Figure 3:
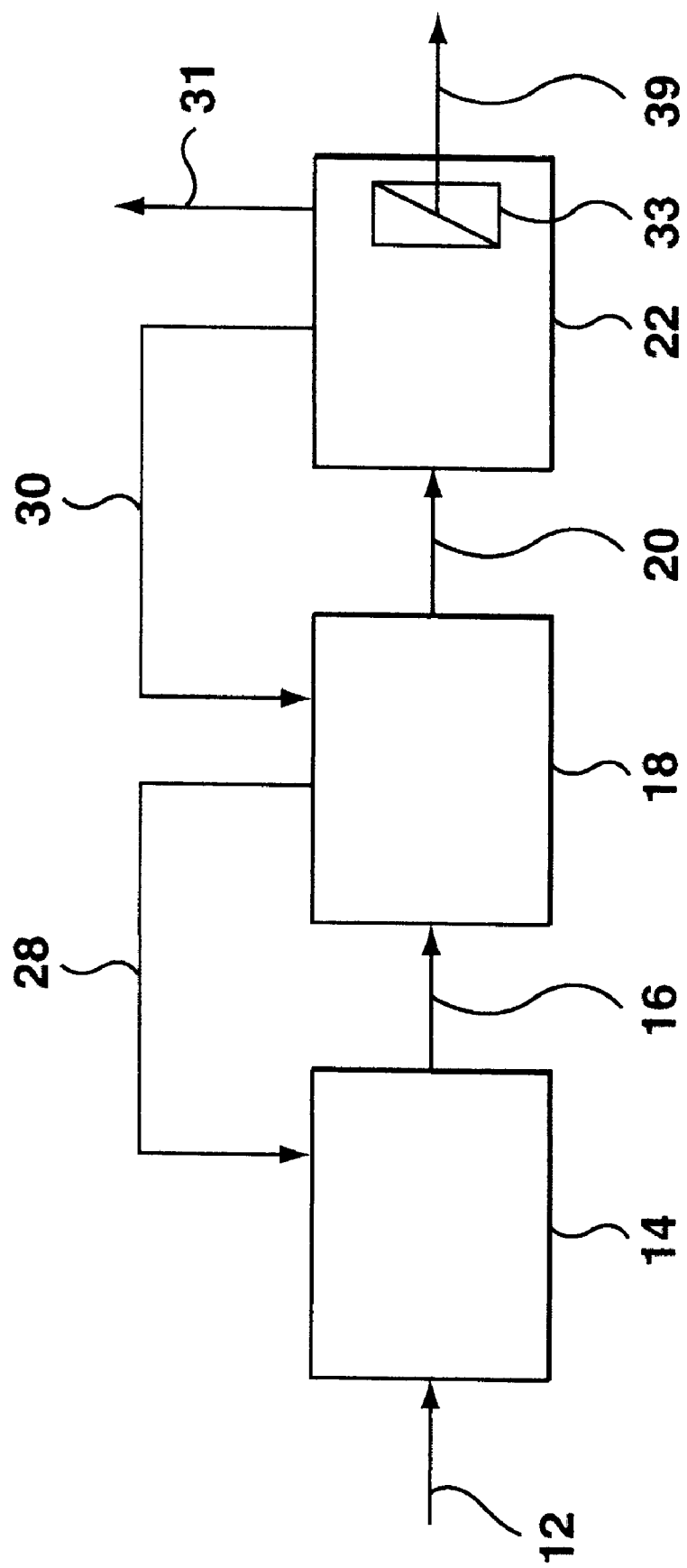
FIG. 3 is a schematic diagram illustrating a third process.

Referring now to FIG. 3, a third process is shown. The third process is similar to the first process but with modifications as described below. In the third process, a second membrane filter 33 is immersed in the aerobic zone 22. The second membrane filter 33 is driven by suction on an interior surface (permeate side) of the membranes, the outside surface (retentate or feed side) of the membranes is in fluid communication with the aerobic mixed liquor. Thus material rejected by the second membrane filter 33 mixes with the aerobic mixed liquor without requiring a retentate recycle stream. As in the second process, material rejected by the membranes leaves the process indirectly, combined with sludge from the process in general, as waste sludge taken from the aerobic zone 22. This waste sludge flows out of the process in a second waste activated sludge stream 31 from the aerobic zone 22 and may be periodically discarded or sent to a secondary sludge management or processing system, such as aerobic or anaerobic digestion.

Although there are differences between the processes described above, they are similar in many respects and are operated under similar process parameters. Net hydraulic retention times (HRT) for all three zones combined (ie. sum of the volume of all three zones divided by the feed rate) ranges from 1 to 24 hours, is preferably between 2 and 12 hours, more preferably between 4.5 and 9 hours. In general, an increase in HRT often increases effluent quality, but increase in effluent quality is less for each additional hour of HRT. Similarly, reducing the HRT increases the output of the process for a given plant size, but effluent quality decreases more rapidly for each hour less of HRT. Sludge retention time ranges from 5 to 40 days and is preferably between 10 and 25 days. MLSS concentration typically ranges between 3 and 30 g/L and is preferably between 5 and 15 g/L. Recycle ratio (recycle to feed) of the nitrified liquor recycle 30 typically ranges between 0.5 and 5 and is preferably between 1 and 2 where the process is used primarily to remove phosphorous. Recycle ratio of the nitrified liquor recycle 30 typically ranges between 1 and 8 and is preferably between 2 and 4 where the process is used primarily to remove phosphorous but nitrogen reduction is also important.

The recycle ratio (recycle to feed) of the denitrified liquor recycle 28 typically ranges from 0.5 to 3, preferably between 1 and 2. Less stringent phosphorous effluent requirements may be met efficiently with a recycle ratio between 0.5 and 1, but typical effluent requirements require a recycle ratio of over 1. Recycle ratios over 2 may result in increased phosphorous removal but only where residual nitrogen levels in the anoxic zone 18 are very low. In typical processes, nitrogen levels in the anaerobic zone 14 become detrimentally high with recycle ratios over 2.

Figure 4:
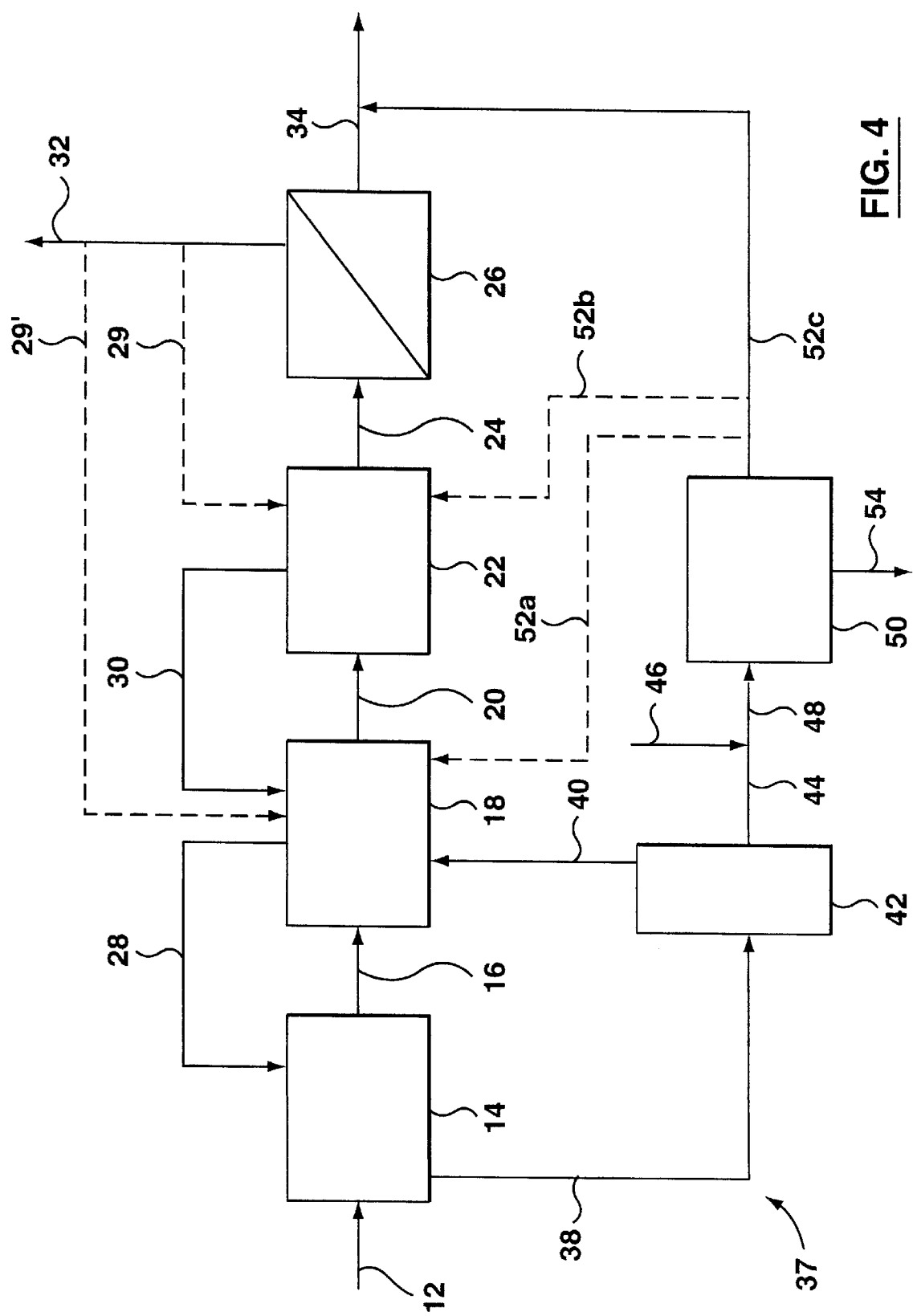
FIG. 4 is a schematic diagram illustrating a first side stream process.

FIG. 4 shows a first side stream process. Although the first side stream process is shown in use with the first process of FIG. 1, it may also be used with the second and third processes of FIGS. 2 and 3. In general, a portion of the anaerobic mixed liquor is treated in a solid-liquid separation device 42. A return stream 40 rich in suspended solids, including activated sludge and organic impurities, is returned to the anoxic zone 18 and a solids lean stream (a first phosphate-rich supernatant or filtrate 44) which is rich in phosphorus is fed to a crystallizer or precipitator 50, where insoluble crystalline phosphates are removed. With this method, phosphorus is removed from the waste water treatment cycle with near stoichiometric amounts of precipitating chemicals. Phosphorous removal is enhanced because less phosphorous needs to be taken up by the Bio-P organisms in the main process. The ability to control phosphorus removal in the crystallizer or precipitator 50 through pH adjustments helps ensure that adequate phosphorus is available in the process for microbial growth to occur. Finally, a useful by-product, high purity struvite, may be recovered which can be used as a fertilizer. Alternatively, phosphates may be precipitated as a metal salt.

In greater detail, a first side stream process is shown generally at 37 and draws anaerobic mixed liquor from the anaerobic zone 14. The first side stream process 37 removes phosphorous from the main process thereby assisting to reduce the build-up of phosphorous in the system. In the anaerobic zone 14, activated sludge releases phosphorous into the liquor. As such, the anaerobic zone 14 contains liquor with the highest phosphorous concentration. A first phosphate-rich flow stream 38 is taken from the anaerobic zone 14 and sent to a separator 42. The separator 42 can use a membrane or other filter media such as a sand filter, a cloth filter, or fibre braids. The separator 42 can also be a clarifier as the inventors' experience with this process has shown the anaerobic sludge to be surprisingly settleable. A solids rich return stream 40, comprising the phosphate-depleted sludge and insoluble organics, exits from the separator 42 and recycles back to the anoxic zone 18. A first phosphate-rich supernatant or filtrate 44 exits the separator 42, is mixed with precipitating chemicals 46, such as calcium or magnesium, and a combined stream 48 is fed into a crystallizer or precipitator 50. Since the first phosphate-rich supernatant or filtrate 44 is substantially free of organic impurities, the number of undesirable side reactions with the precipitating chemicals 46 is reduced. As such, the precipitating chemicals 46 can be added in near stoichiometric amounts to precipitate out the insoluble phosphates.

A preferred method of crystallization involves using granular seed materials, preferably high density coral sands with grain size between 0.25 and 2.0 mm, to initiate and aid crystallization. Preferably, the addition of magnesium, ammonium and possibly additional phosphates allow high purity struvite (MgNH3PO4*6H2O) to form and collect at the bottom of the crystallizer or precipitator 50. A bottoms flow stream 54 containing the insoluble phosphates is removed from the system and collected. A crystallizer or precipitator exit stream 52, which is both phosphate and nitrate lean may be returned to the anoxic zone 18 (52*a*), the aerobic zone 22 (52*b*) or be combined with the effluent stream 34 (52*c*) depending on whether it needs further treatment. For example, crystallizer or precipitator exit stream 52 high in COD is returned to the aerobic zone to decrease its COD concentration before it is discharged from the process.

A preferred method of precipitation involves using alum as the precipitating chemical 46. Surprisingly, there appears to be an optimum dosage ranging between 400 and 800 mg/L at which maximum phosphorous is removed. Within this range, phosphorous removal is over 50% and may be as high as 93%. Phosphorous removal between 75% to 85% was reliably achieved in testing using a dosage of 600 mg/L of alum.

Figure 5:
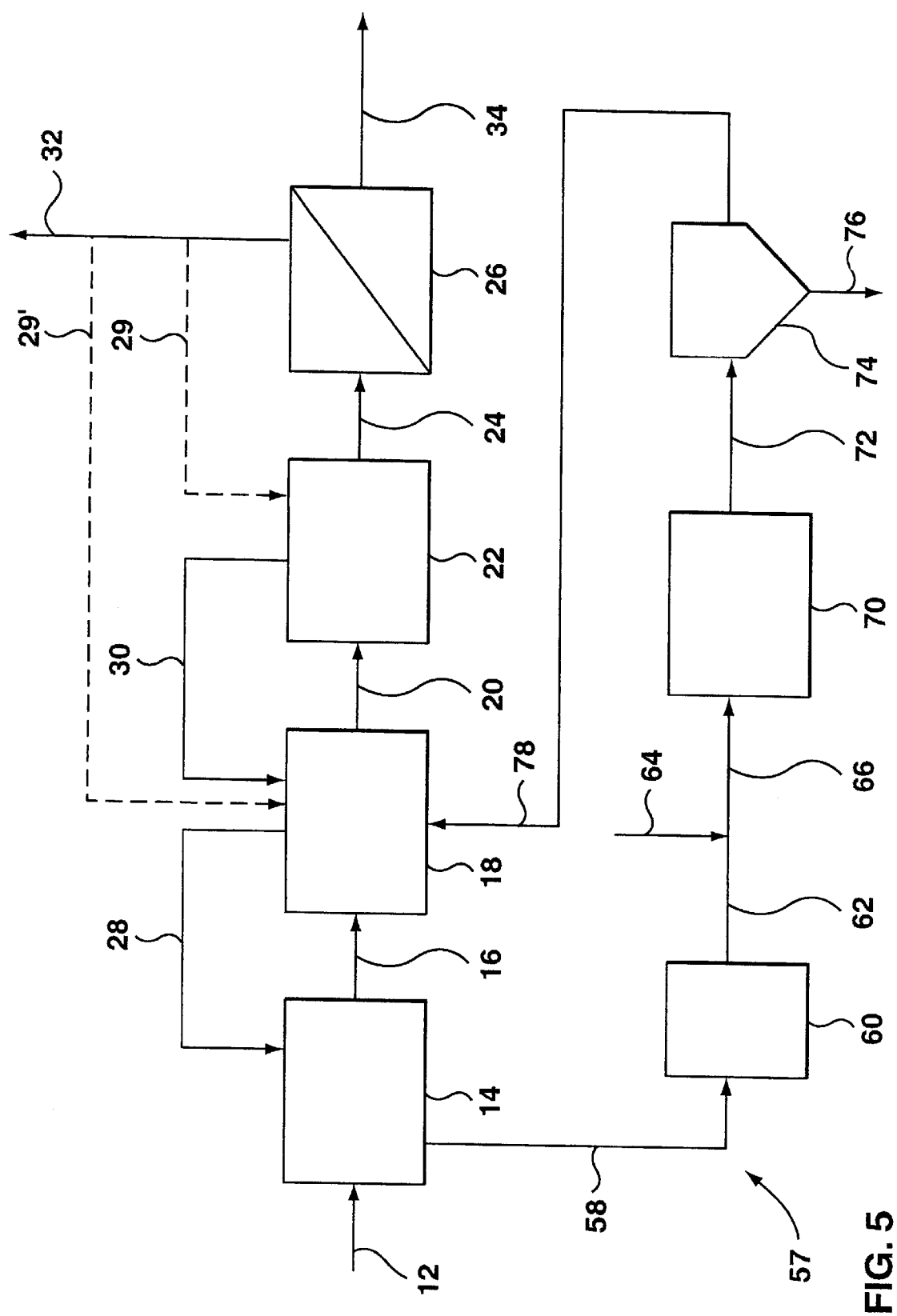
FIG. 5 is a schematic illustration of a second side stream process.

FIG. 5 shows a second side stream process. Although the second side stream process is shown in use with the first process of FIG. 1, it may also be used with the second and third processes of FIGS. 2 and 3. In the second side stream process, sludge is optionally filtered through a screen to remove any large objects, hair or other trash that could interfere with the other operations in the side stream process. Subsequently, chemicals are added to a reaction zone to create insoluble phosphates. The stream is then passed to a hydrocyclone which separates the organics from the inorganics, grit, and inerts, which include the insoluble phosphates. The phosphates are disposed of as inorganic waste, and the phosphorous-depleted activated sludge is recycled back to the anoxic zone.

The second side stream process is shown generally at 57 to draw anaerobic sludge from the anaerobic zone 14. The second side stream process 57 removes phosphates from the main process thereby assisting to reduce the build-up of phosphates in the system. As discussed above, the anaerobic zone 14 contains liquor with the highest phosphate concentration. A second phosphate-rich flow stream 58 exits from the anaerobic zone 14 and flows to a screen 60 to separate trash etc which leaves the process to be treated further or discarded. A screen exit stream 62 from the screen 60 is mixed with a precipitating chemicals flow stream 64, which contains chemicals such as ferrous chloride and aluminum sulphate, and a second combined stream 66 is sent to a reaction zone 70, or alternately to a precipitation tank. A reaction zone exit stream 72 from the reaction zone 70 flows to a hydrocyclone 74. The hydrocyclone 74 separates the organic material from the inorganics, including insoluble phosphates, grit, and other inerts, due to the differences in densities. Hydrocyclone bottoms 76, including the insoluble phosphates, grit, and other inerts, are landfilled, applied to the land or otherwise processed or wasted. A sixth waste activated sludge stream 78 which exits the hydrocyclone 74 is sent back to the anoxic zone 18.

EXAMPLES

An experimental reactor was set up as shown in FIG. 3. The membrane filter consisted of four ZEEWEED™ ZW-10™ modules produced by Zenon Environmental Inc. having a total of 40 square feet of membrane surface area. A control reactor was set up as shown in FIG. 2 but (a) using a clarifier instead of the membrane filter 26, (b) recycling the clarifier bottoms to the anoxic zone 18 and (c) not using a retentate recycle stream 29 or nitrified liquor recycle 30. Both reactors had a volume of 1265 L, the volume of the clarifier not being counted as reactor volume. Sludge retention time (SRT) was kept constant at 25 days.

Three experimental runs were conducted with the experimental reactor at hydraulic retention times (HRTs) of 9 hours, 6 hours and 4.5 hours produced by varying the feed flow rate. The control reactor was run successfully at a hydraulic retention time of 9 hours using the same operating parameters as for the run of the experimental reactor with a 9 hour HRT. Running the control reactor at a hydraulic retention time of 6 hours was attempted, but adequate operation could not be achieved (because the clarifier failed), most conventional processes running at an HRT of about 12. The sizes of the zones and the HRTs of each zone are summarized in Table 1 below

TABLE 1

| Process Zone Sizing | Anaerobic Zone | Anoxic Zone | Aerobic Zone | Overall Bioreactor |
|---|---|---|---|---|
| Volume Fraction | 1/11 | 4/11 | 6/11 | 11/11 |
| Working Volume | 115 | 460 | 690 | 1265 |
| Operating HRTs | [hr] | [hr] | [hr] | [hr] |
| Run #1 | 0.82 | 3.27 | 4.91 | 9.0 |
| Run #2 | 0.55 | 2.18 | 3.27 | 6.0 |
| Run #3 | 0.41 | 1.64 | 2.45 | 4.5 |

During the first run, the experimental and control reactors were operated at a 9 hour HRT for 16 weeks. The MLSS concentration varied between 3–5 g/L during this period. A summary of the average P and N concentrations for both reactors is shown in Table 2 below. As shown in that table, the experimental reactor achieved a greater reduction of o-PO4. Effluent P was generally below 0.3 mg/L for the experimental process while effluent P for the control process varied from 0.2–0.7 mg/L. Both processes had similar reduction of NH3. The experimental reactor had not been optimized for nitrogen removal. The nitrified recycle was set nominally at a 1:1 (recycle to feed) to be the same as the control process. Other experiments, to be described below, revealed that a recycle ratio of 3:1 produced better nitrogen removal in the experimental process. Nevertheless, the experimental process removed greater than 80% of total nitrogen at the 1:1 recycle ratio.

TABLE 2

| Process | Parameter | Influent | Anaerobic Zone | Anoxic Zone | Aerobic Zone | Effluent | Reduction |
|---|---|---|---|---|---|---|---|
| Experimental | o-PO$_4$ [mg/l] | 3.04 | 8.66 | 2.61 | 0.17 | 0.11 | 96.4% |
| | NH3—N [mg/L] | 22.0 | 12.7 | 5.7 | 0.1 | 0.09 | 99.6% |
| | NO3—N [mg/L] | — | 0.13 | 0.28 | 5.68 | 5.72 | |
| Control | o-PO$_4$ [mg/L] | 3.04 | 6.09 | 5.07 | 0.27 | 0.50 | 83.6% |
| | NH3—N [mg/L] | 22.0 | 11.3 | 54 | 0.04 | 0.11 | 99.5% |
| | NO3—N [mg/L] | — | 0.15 | 0.10 | 5.79 | 2.60 | |

During the second run, the experimental reactor was operated at a 6 hour HRT for about 14 weeks. The MLSS concentration increased from about 4 mg/L at the start to about 8 mg/L at the end of the run. By the end of the run, the experimental process had stabilized in terns of VFA uptake and phosphorous release in the anaerobic section. There was a slow and steady improvement in performance as the experimental run progressed, the monthly average effluent P dropping from 0.178 mg/L to 0.144 mg/L to 0.085 mg/L over the approximately three months of the test. The inventors believe that at least part of this improvement can be attributed to the increase in MLSS over the duration of the test. Effluent NH3 was less than 0.5 mg/L and total nitrogen removal was greater than 80%.

As mentioned above, the control reactor could not be operate adequately at this HRT. During periods when the control reactor was operated, effluent P varied between 0.1–0.9 mg/L.

During the third run, the experimental reactor only was run at an HRT of 4.5 hours. MLSS concentration increased to 15 g/L. Effluent P concentrations were generally below 0.5 mg/L over a three month period, still better than the P removal of the control reactor operated at a 9 hour HRT.

In other experiments, the experimental process was operated at an HRT of 6 hours but the recycle from the aerobic zone to the anoxic zone was modified from a recycle ratio (recycle to feed) of 1:1 to 3:1. N and P removal were measured at each recycle ratio and the results included in Table 3 below. Nitrogen removal increased with the increased recycle ratios while P removal was generally unaffected.

TABLE 3

| Recycle Ratio | Influent Total N (mg/L as N) | Effluent Total N (mg/L as N) | N-Removal Efficiency | Effluent PO$_4$ (mg/L as P) | P-Removal Efficiency |
|---|---|---|---|---|---|
| 1:1 | 49.6 | 11.8 | 76.4% | 0.07 | 98.9% |
| 1.5:1 | 49.8 | 9.0 | 81.6% | 0.15 | 97.7% |
| 2:1 | 40.7 | 5.8 | 85.8% | 0.15 | 97.3% |
| 3:1 | 42.1 | 5.3 | 87.5% | 0.12 | 97.8% |

It is to be understood that what has been described are preferred embodiments of the invention. The invention nonetheless is susceptible to certain changes and alternative embodiments fully comprehended by the spirit of the invention as defined by the claims below.

We claim:

1. A process for treating water to remove phosphorous and nitrogen comprising the steps of:
    (a) providing an anaerobic zone having an anaerobic mixed liquor having organisms which release phosphorous into the anaerobic mixed liquor and store volatile fatty acids from the anaerobic mixed liquor;
    (b) providing an anoxic zone having an anoxic mixed liquor having organisms which metabolize stored volatile fatty acids, uptake phosphorous and denitrify the anoxic mixed liquor;
    (c) providing an aerobic zone having an aerobic mixed liquor having organisms which metabolize stored volatile fatty acids, uptake phosphorous and nitrify the aerobic mixed liquor;
    (d) flowing water to be treated into the anaerobic zone;
    (e) flowing anaerobic mixed liquor to the anoxic zone;
    (f) flowing anoxic mixed liquor to the anaerobic zone;
    (g) flowing anoxic mixed liquor to the aerobic zone;
    (h) flowing aerobic mixed liquor to the anoxic zone;
    (i) contacting aerobic mixed liquor against the feed side of a membrane filter;
    (j) producing a treated effluent lean in phosphorous, nitrogen, BOD OR COD, suspended solids and organisms from a permeate side of the membrane filter; and,
    (k) removing some or all of the material rejected by the membrane filter from the process,
    wherein the steps above are performed substantially continuously and substantially simultaneously and wherein the MLSS is between 3 and 30 g/L.

2. The process of claim 1 wherein the MLSS is between 5 and 15 g/L.

3. The process of claim 1 wherein material rejected by the membrane filter is also mixed with the aerobic mixed liquor.

4. The process of claim 3 wherein the step of removing material rejected by the membrane filter from the process is accomplished by removing aerobic mixed liquor containing material rejected by the membrane filter.

5. The process of claim 1 wherein material rejected by the membrane filter is also mixed with the anoxic mixed liquor.

6. The process of claim 1 wherein the net hydraulic retention time for the anaerobic, anoxic and aerobic zones combined is between 2 and 12 hours.

7. The process of claim 1 wherein the net hydraulic retention time for the anaerobic, anoxic and aerobic zones combined is between 2 and 9 hours.

8. The process of claim 1 wherein the net hydraulic retention time for the anaerobic, anoxic and aerobic zones combined is between 4.5 and 9 hours.

9. The process of claim 1 wherein the sludge retention time is between 10 and 30 days and a crystalline phosphorous accumulation occurs in the mixed liquor.

10. The process of claim 1 wherein the recycle ratio between the aerobic zone and the anoxic zone is between 2 and 4.

11. A process for treating water to remove phosphorous and nitrogen comprising the steps of:
   (a) providing an anaerobic zone having an anaerobic mixed liquor having organisms which release phosphorous into the anaerobic mixed liquor and store volatile fatty acids from the anaerobic mixed liquor;
   (b) providing an anoxic zone having an anoxic mixed liquor having organisms which metabolize stored volatile fatty acids, uptake phosphorous and denitrify the anoxic mixed liquor;
   (c) providing an aerobic zone having an aerobic mixed liquor having organisms which metabolize stored volatile fatty acids, uptake phosphorous and nitrify the aerobic mixed liquor;
   (d) flowing water to be treated into the anaerobic zone;
   (e) flowing anaerobic mixed liquor to the anoxic zone;
   (f) flowing anoxic mixed liquor to the anaerobic zone;
   (g) flowing anoxic mixed liquor to the aerobic zone;
   (h) flowing aerobic mixed liquor to the anoxic zone;
   (i) contacting aerobic mixed liquor against the feed side of a membrane filter;
   (j) producing a treated effluent lean in phosphorous, nitrogen, BOD OR COD, suspended solids and organisms from a permeate side of the membrane filter; and,
   (k) removing some or all of the material rejected by the membrane filter from the process,
   (l) extracting a liquid containing phosphorous but lean in solids from the anaerobic mixed liquor;
   (m) precipitating phosphorous from the liquid containing phosphorous but lean in solids; and,
   (n) producing a phosphorous lean effluent from the liquid containing phosphorous but lean in solids,
   wherein the steps above are performed substantially continuously and substantially simultaneously.

12. The process of claim 11 wherein material rejected by the membrane filter is also mixed with the aerobic mixed liquor.

13. The process of claim 12 wherein the step of removing material rejected by the membrane filter from the process is accomplished by removing aerobic mixed liquor containing material rejected by the membrane filter.

14. The process of claim 11 wherein material rejected by the membrane filter is also mixed with the anoxic mixed liquor.

15. The process of claim 11 wherein the phosphorous is precipitated by the addition of between 400 to 800 mg/L of alum.

16. A process for treating water to remove phosphorous and nitrogen comprising the steps of:
   (a) providing an anaerobic zone having an anaerobic mixed liquor having organisms which release phosphorous into the anaerobic mixed liquor and store volatile fatty acids from the anaerobic mixed liquor;
   (b) providing an anoxic zone having an anoxic mixed liquor having organisms which metabolize stored volatile fatty acids, uptake phosphorous and denitrify the anoxic mixed liquor;
   (c) providing an aerobic zone having an aerobic mixed liquor having organisms which metabolize stored volatile fatty acids, uptake phosphorous and nitrify the aerobic mixed liquor;
   (d) flowing water to be treated into the anaerobic zone;
   (e) flowing anaerobic mixed liquor to the anoxic zone;
   (f) flowing anoxic mixed liquor to the anaerobic zone;
   (g) flowing anoxic mixed liquor to the aerobic zone;
   (h) flowing aerobic mixed liquor to the anoxic zone;
   (i) treating aerobic mixed liquor in a solid-liquid separator to produce a treated effluent lean in phosphorous, nitrogen suspended solids and organisms and a liquid rich in solids rejected by the solid liquid separator;
   (j) removing some or all of the liquid rich in solids rejected by the solid-liquid separator;
   (k) extracting a phosphorous containing permeate lean in solids from the anaerobic mixed liquor;
   (l) precipitating phosphorous from the phosphorous containing permeate lean in solids; and,
   (m) producing a phosphorous lean effluent from the phosphorous containing permeate lean in solids,
   wherein the steps above are performed substantially continuously and substantially simultaneously.

17. The process of claim 16 wherein the phosphorous is precipitated by the addition of between 400 to 800 mg/L of alum.

* * * * *